Figure 7:
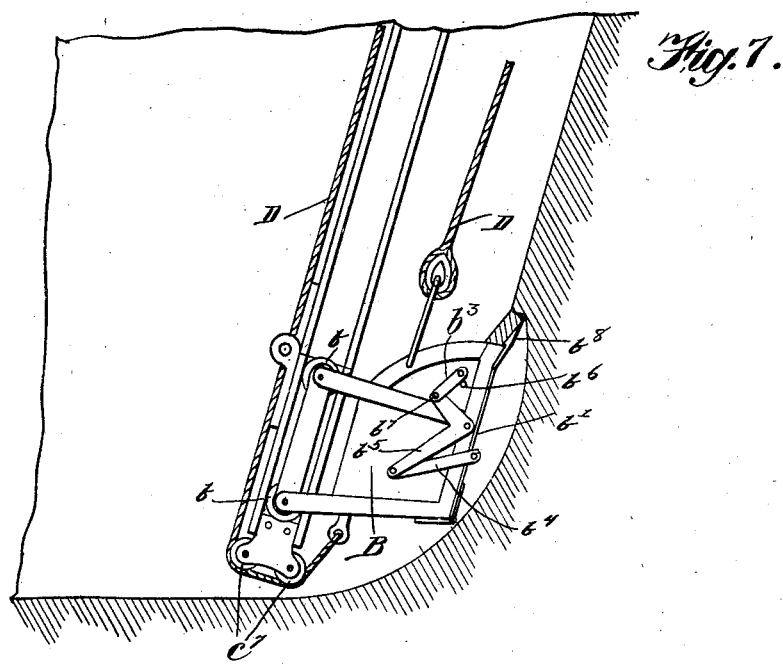

No. 733,939. PATENTED JULY 21, 1903.
F. M. BISBEE.
EXCAVATING MACHINE.
APPLICATION FILED APR. 22, 1902.
NO MODEL. 10 SHEETS—SHEET 1.
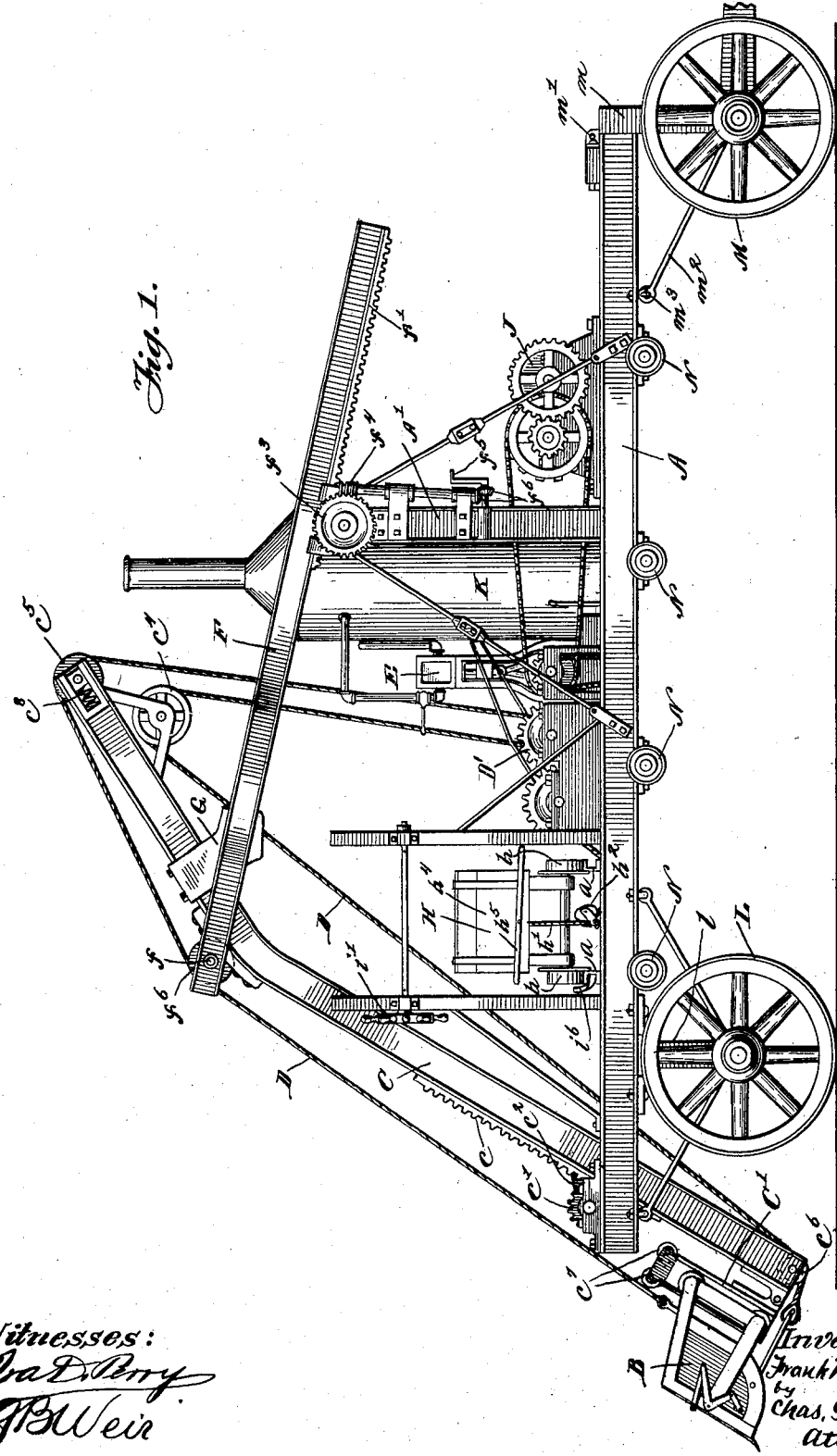
Witnesses:
Ira D. Perry
J. B. Weir
Inventor:
Frank M. Bisbee
by Chas. G. Page
Atty.

No. 733,939. PATENTED JULY 21, 1903.
F. M. BISBEE.
EXCAVATING MACHINE.
APPLICATION FILED APR. 22, 1902.
NO MODEL. 10 SHEETS—SHEET 2.
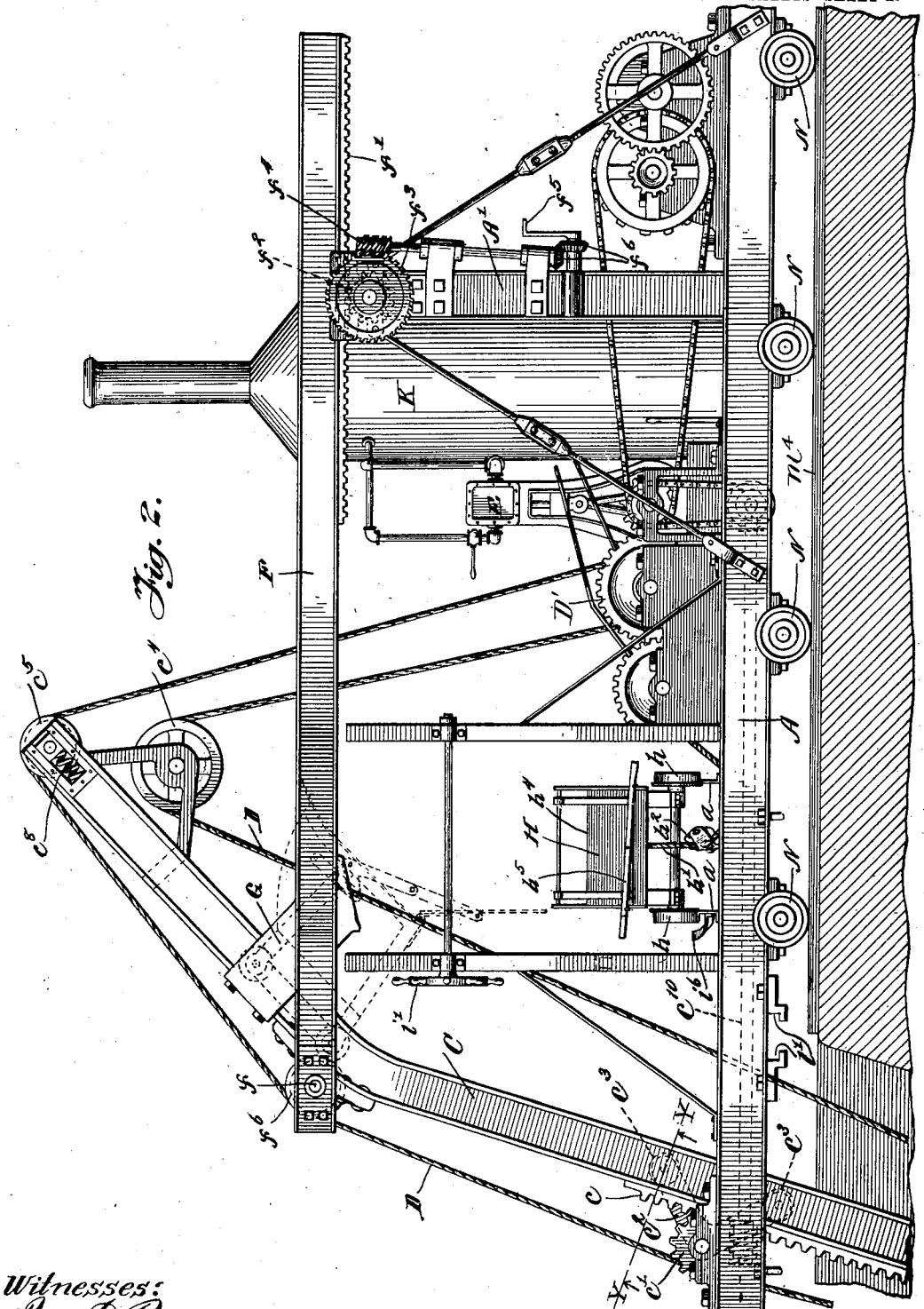
Witnesses:
Ira D. Perry
J. B. Weir
Inventor:
Frank M. Bisbee
by Chas. G. Page atty.

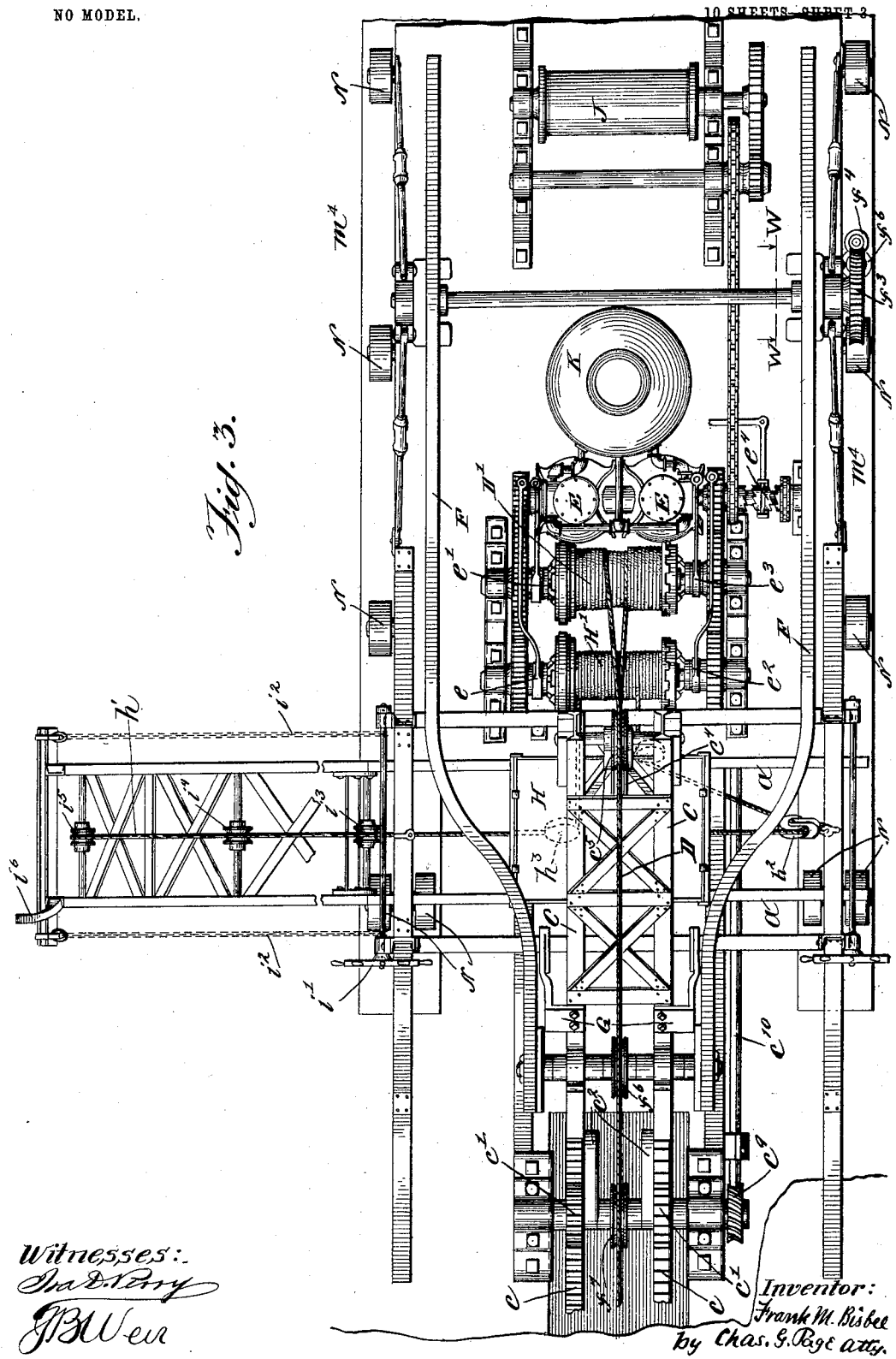

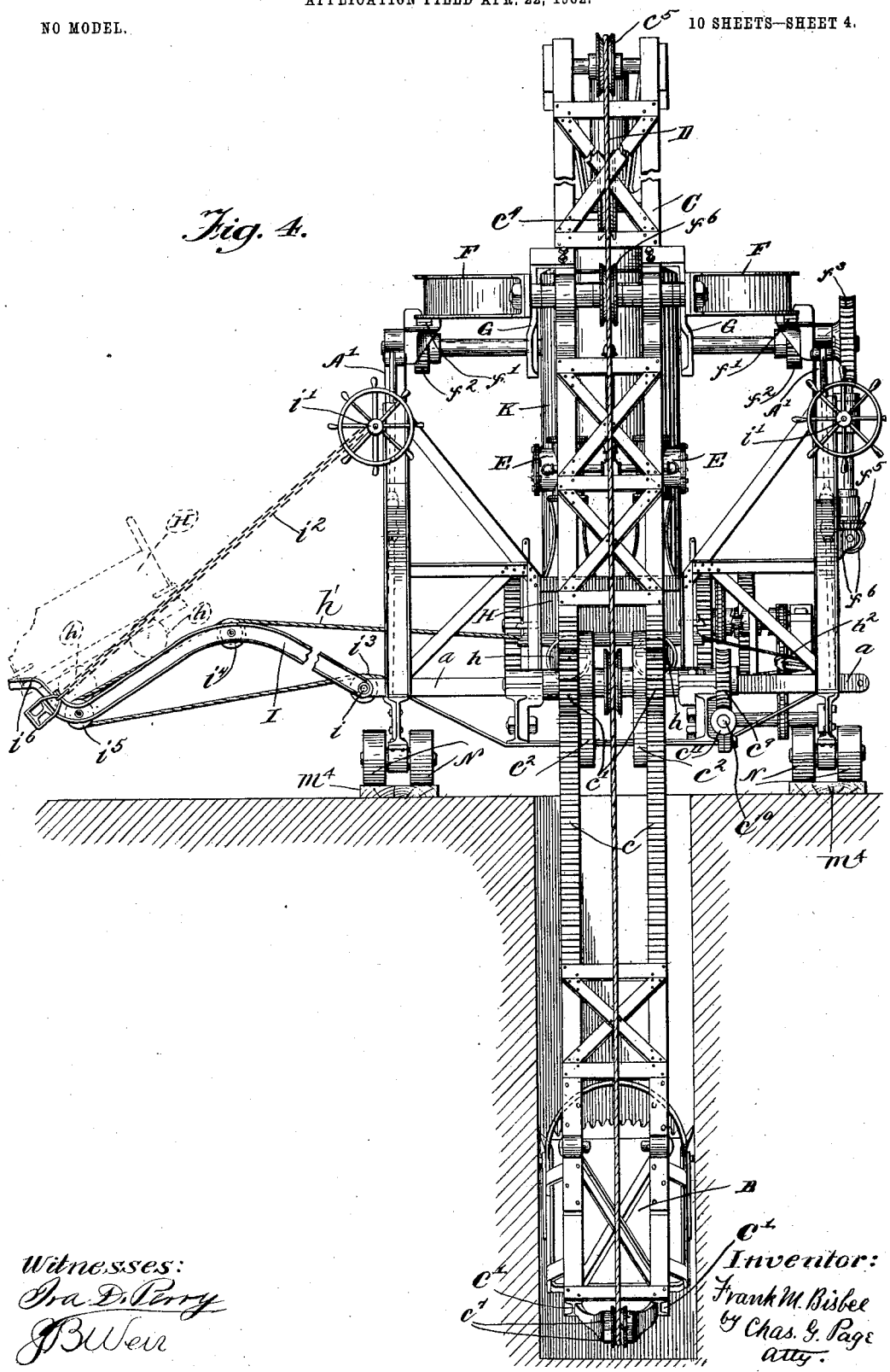

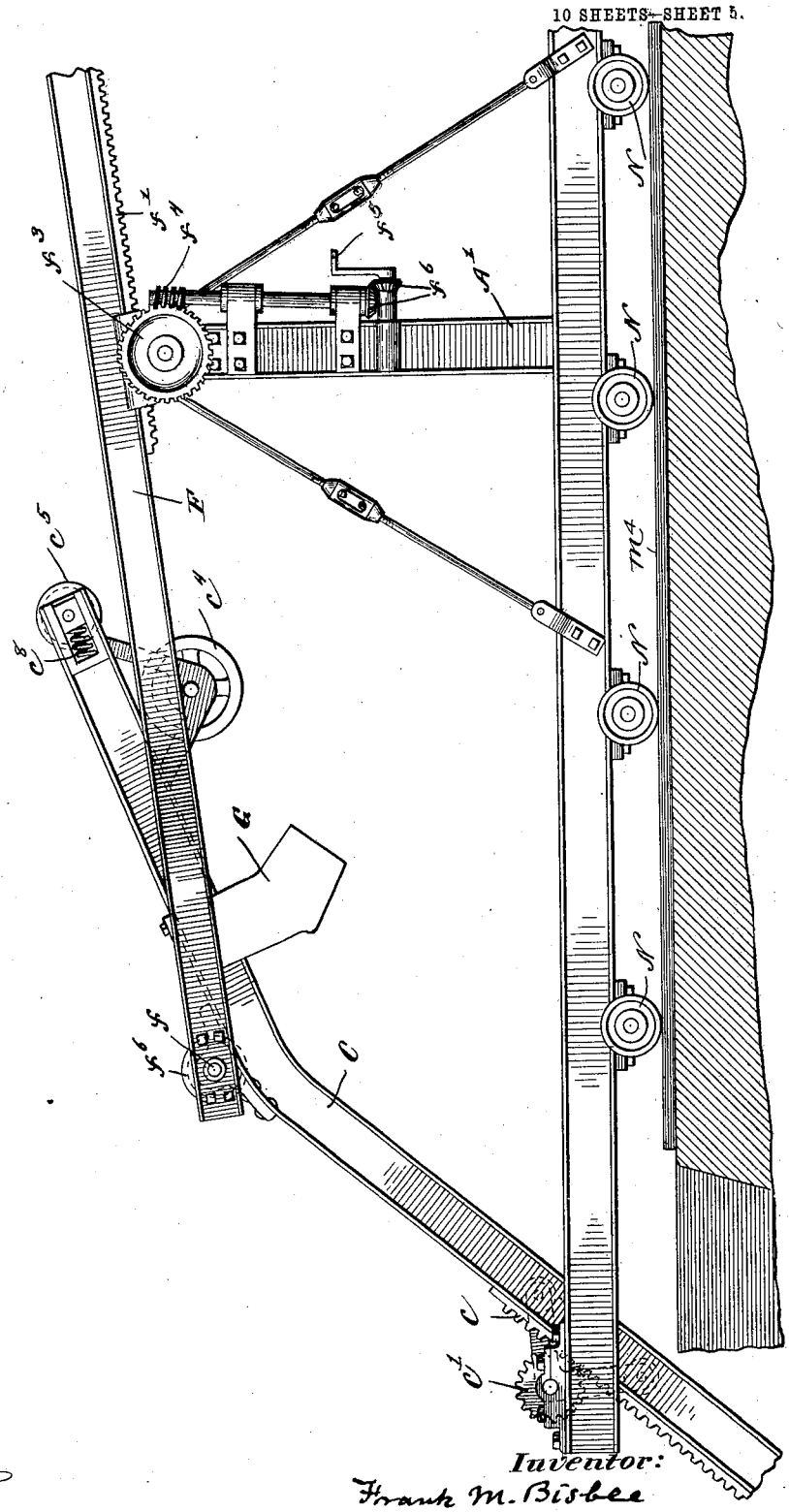

No. 733,939. PATENTED JULY 21, 1903.
F. M. BISBEE.
EXCAVATING MACHINE.
APPLICATION FILED APR. 22, 1902.
NO MODEL. 10 SHEETS—SHEET 6.

Witnesses:
Ira D. Perry
J B Weir

Inventor:
Frank M. Bisbee
by Chas. G. Page Atty.

No. 733,939. PATENTED JULY 21, 1903.
F. M. BISBEE.
EXCAVATING MACHINE.
APPLICATION FILED APR. 22, 1902.
NO MODEL. 10 SHEETS—SHEET 7.
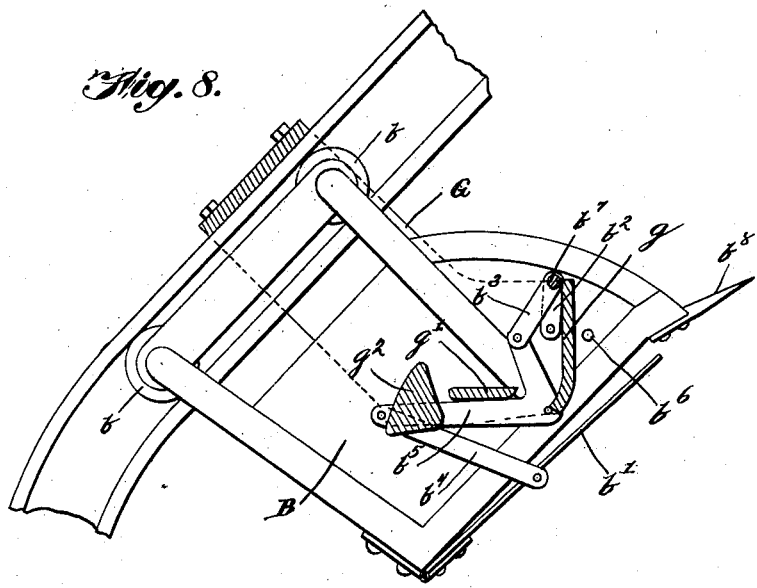
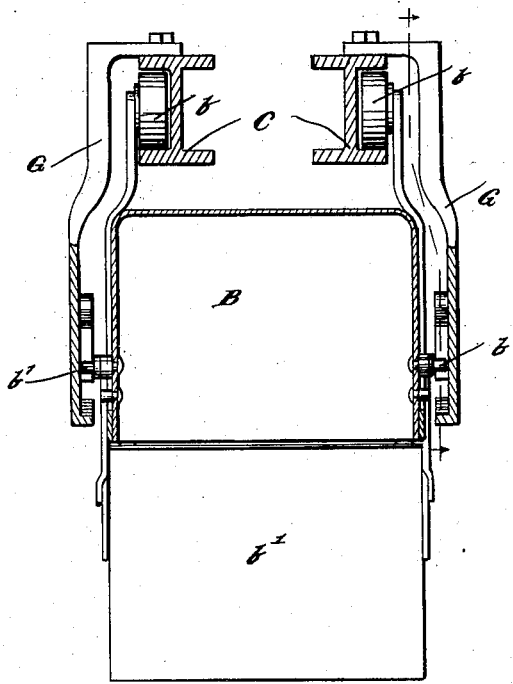
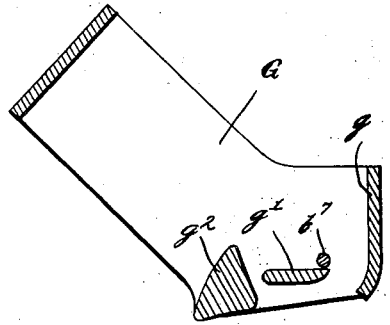
Witnesses:
Inventor:
Frank M. Bisbee
by Chas. G. Page Atty.

No. 733,939. PATENTED JULY 21, 1903.
F. M. BISBEE.
EXCAVATING MACHINE.
APPLICATION FILED APR. 22, 1902.
NO MODEL. 10 SHEETS—SHEET 8.
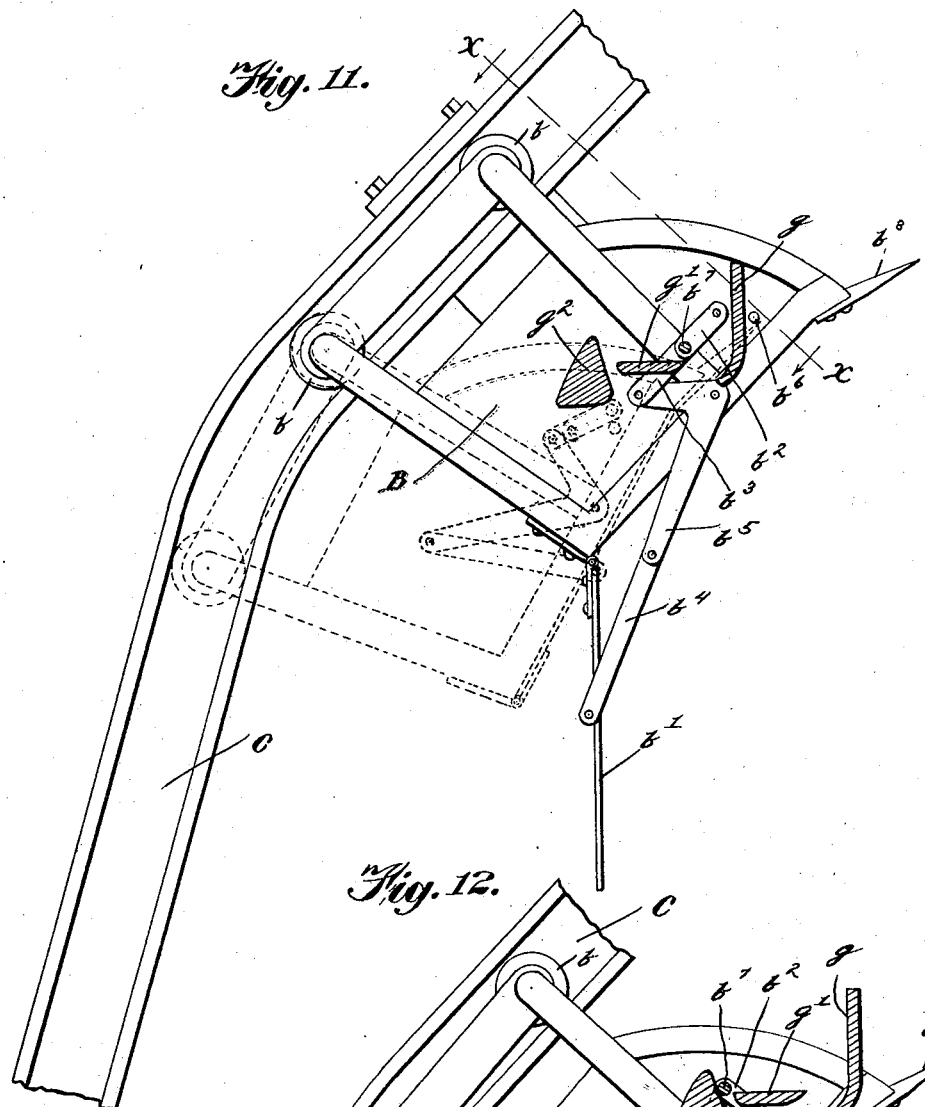
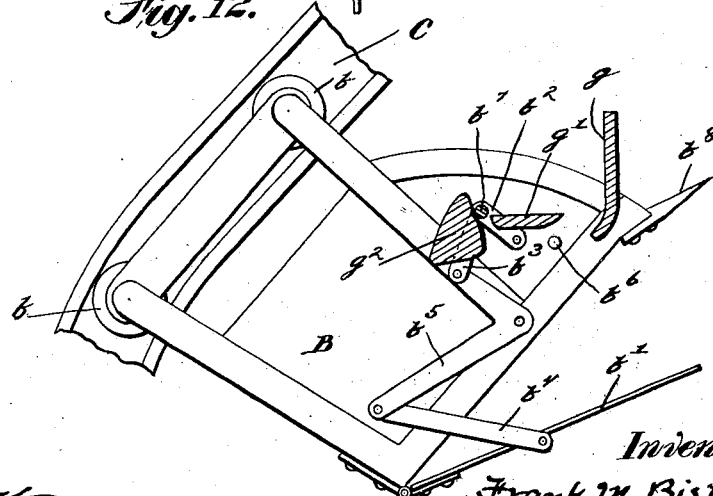
Witnesses:
Inventor:
Frank M. Bisbee
by Chas. G. Page Atty.

No. 733,939. PATENTED JULY 21, 1903.
F. M. BISBEE.
EXCAVATING MACHINE.
APPLICATION FILED APR. 22, 1902.
NO MODEL. 10 SHEETS—SHEET 9.
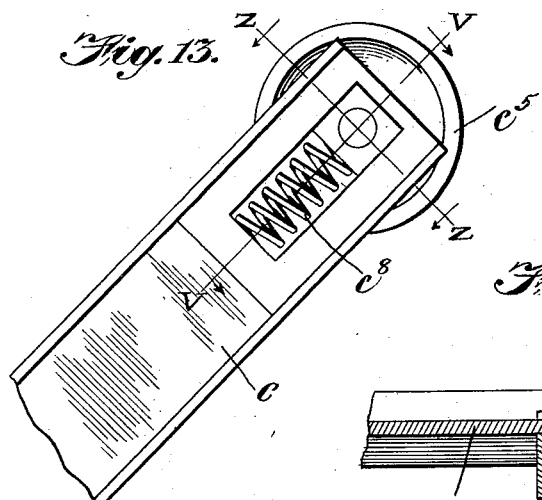
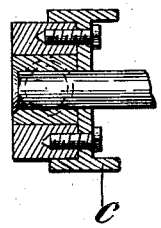
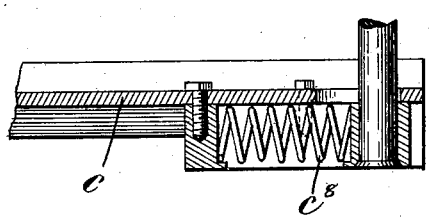
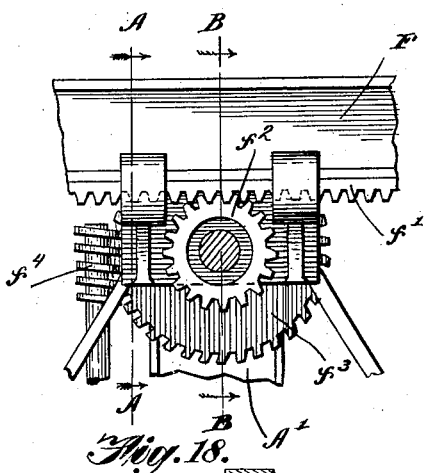
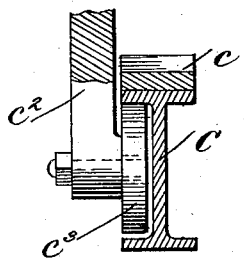
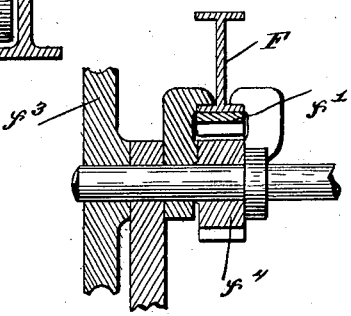
Witnesses:
Inventor.
Frank M. Bisbee
by Chas. G. Page Atty

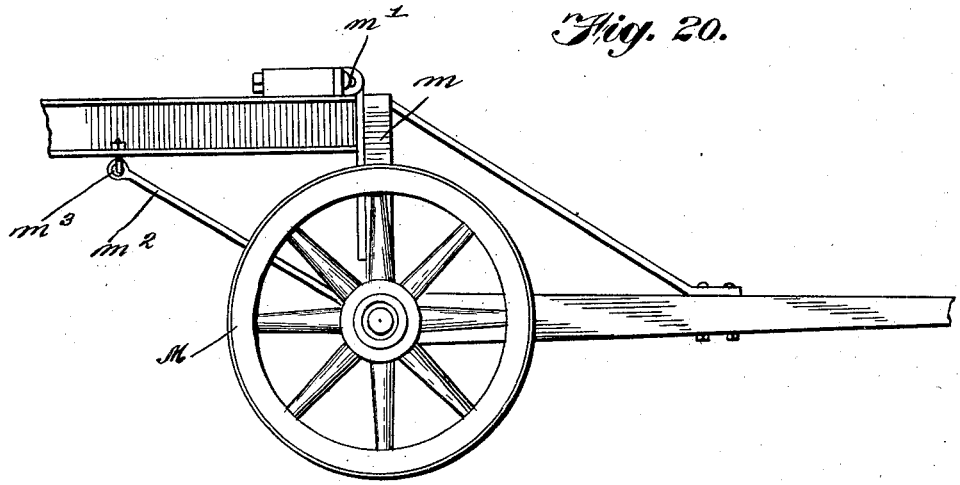
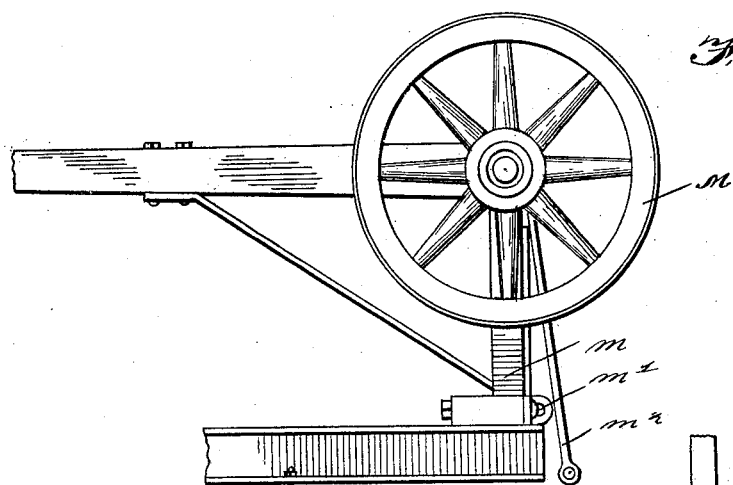
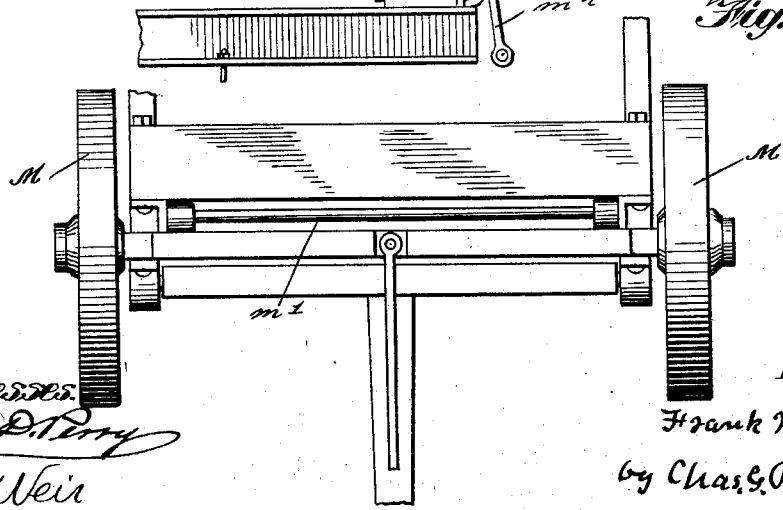

No. 733,939. Patented July 21, 1903.

UNITED STATES PATENT OFFICE.

FRANK M. BISBEE, OF CHICAGO, ILLINOIS, ASSIGNOR TO FREDERICK C. AUSTIN, OF CHICAGO, ILLINOIS.

EXCAVATING-MACHINE.

SPECIFICATION forming part of Letters Patent No. 733,939, dated July 21, 1903.

Application filed April 22, 1902. Serial No. 104,148. (No model.)

*To all whom it may concern:*

Be it known that I, FRANK M. BISBEE, a citizen of the United States, residing at Chicago, in the county of Cook and State of Illinois, have invented a certain new and useful Improvement in Excavating-Machines, of which the following is a specification.

My invention relates to an excavator designed more particularly for use in digging trenches and building sewers. Excavators for this purpose are usually provided with an excavating device adapted to be lowered into the cut or trench and adapted to load and carry the dirt upward, the machine being caused to move gradually forward for the purpose of enabling the excavating device to make the desired progress in forming the trench or ditch. It is also the practice to provide an arrangement whereby the excavating device may automatically unload at the desired point of discharge.

Generally stated, the object of my invention is to provide a simple and efficient excavating-machine of the foregoing character.

A special object is to provide an improved form of excavating-bucket.

Another object is to provide an improved arrangement whereby the depth of the ditch or trench may be varied according to requirements.

A further object is to provide an improved arrangement for disposing of the dirt discharged from the excavating-bucket.

Another object is to provide a construction and arrangement whereby the excavating-bucket may be caused to operate or progress below the surface of the ground at the end of the trench or, in other words, whereby the bucket may be employed for making an undercut at the end of the trench.

A further object is to provide an improved arrangement or device for causing the bucket to automatically unload at the desired point of discharge.

A further object is to provide an improved arrangement of cables and winding-drums for operating the bucket.

Another object is to provide suitable means whereby the relatively large vehicle-wheels which are employed in transporting the machine from one place to another may be readily withdrawn for the purpose of allowing a plurality of relatively small wheels to support the machine in an operative position.

In addition to these it is also an object to provide certain details and features of improvement tending to increase the general efficiency and to render an excavating-machine of this type more serviceable and satisfactory in use.

To the foregoing and other useful ends my invention contemplates an excavating-bucket constructed and arranged to travel up and down upon a tilting bucket-beam. This bucket-beam is preferably mounted for bodily adjustment, so as to allow it to be lowered into the cut or trench and so as to permit the depth of the latter to be varied in accordance with requirements. A simple and efficient arrangement is provided for varying the angle of this bucket-beam, so as to permit the bucket to work either perpendicularly or at an angle. As a matter of special improvement the arrangement is such that the upper portion of the beam can be tilted rearward, so as to enable the bucket to make an undercut at the end of the trench. A simple and efficient arrangement of cables is provided for causing the bucket to move up and down upon the beam. In order to permit the bucket to operate upon the bottom of the trench or ditch, the bucket-beam is preferably provided with a hinged lower section which is adapted to cause the bucket to assume an inverted position before commencing to load. In this way the bucket in loading first moves downward in an inverted position and is then drawn around and up the forward side of the beam, loading as it travels. An arrangement is provided for enabling the bucket to unload at the desired point of discharge, and the dirt thus discharged is received by a car arranged to travel back and forth across the machine. A track is provided and arranged to project laterally from the side of the machine, so as to allow the car after filling to travel outwardly and automatically discharge its load at the side of the machine. The construction is such that this track can be shifted from one side of the machine to the other, so as to permit the dirt to be discharged at either side of the line of travel. Preferably the winding-drums and cables, both for operating the excavating-bucket and drawing the car back and forth, are driven by an engine mounted upon the body-frame. A warping-drum can be mounted upon the forward portion of the machine, and in this way and through the medium of suitable power-transmitting connection the said engine can also be employed for causing the machine to move gradually forward as the excavating progresses. Relatively large vehicle-wheels are employed in transporting the machine from one place to another, and the arrangement is preferably such that these wheels can be removed or withdrawn from under the body-frame, so as to allow the machine to rest upon a number of relatively small rolls or wheels which are adapted to travel upon tracks or planks laid along the ground. The nature and advantages of my improved excavating-machine will, however, hereinafter more fully appear.

Figure 6:
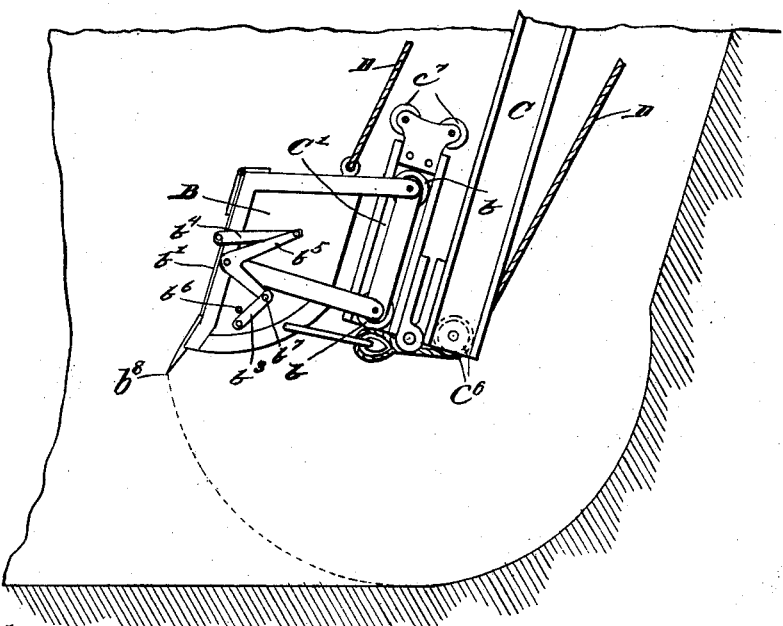

In the accompanying drawings, Figure 1 is a side elevation of an excavating-machine embodying the principles of my invention. In this view it will be seen that the excavating-bucket and the bucket-beam are adjusted into an elevated positon and that the machine is mounted upon relatively large vehicle-wheels, so as to adapt it for transportation from one place to another. Fig. 2 is an enlarged side elevation of the body-frame and upper portions of the machine shown in Fig. 1. In this view it will be seen, however, that the relatively large vehicle-wheels have been removed and that the machine is now supported by a number of relatively small rolls or wheels which are adapted to travel along the planks or rails laid along the ground. It will also be seen that the bucket and the lower portion of the bucket-beam, which are supposed to be at the bottom of the trench, are shown broken away for convenience of illustration. Fig. 3 is a plan of the excavating-machine shown in Fig. 2. Fig. 4 is a rear end elevation of the machine shown in Fig. 2. Fig. 5 is a detail of the body-frame, bucket-beam, and bucket-beam shifter, illustrating the extreme angle or forward inclination of the upper end of the bucket-beam. Figs. 6 and 7 are side elevations of the bucket and the lower portion of the bucket-beam, illustrating the manner in which the bucket operates and showing the bucket first in its inverted position or position which it assumes before commencing to load and then showing the bucket right side up and loading as it drags or travels upward against the forward end of the cut or trench. Fig. 8 is a side elevation of the bucket and of an upper portion of the bucket-beam, illustrating the arrangement to automatically unload at the desired point of discharge. In this view the forward swinging wall of the bucket is just starting to open, the locking mechanism for locking this wall in place having just been engaged by one of a series of cams. Fig. 9 is a sectional view on line X X in Fig. 11 and looking in the direction indicated by the arrows. Fig. 10 is a detail of one of the plates or castings constructed with the cams for automatically releasing the swinging wall of the bucket. Fig. 11 is a view similar to Fig. 8, but illustrating the bucket as having moved upward to an extent to allow its swinging wall to drop down and release the load. It will also be seen that in this view the dotted line indicates the position occupied by the bucket either just before or after the discharge of its contents. Fig. 12 is a view similar to Figs. 8 and 11, but showing the bucket moving downwardly and illustrating the manner in which the cams coöperate in automatically closing and locking the swinging front wall of the bucket. Fig. 13 is an enlarged detail view of the upper portion of the bucket-beam. Fig. 14 is a section on line Z Z in Fig. 13. Fig. 15 is a section on line V V in Fig. 13. Fig. 16 is an enlarged detail section on line Y Y in Fig. 2. Fig. 17 is an enlarged sectional view on line W W in Fig. 3. Fig. 18 is a section on line A A in Fig. 17. Fig. 19 is a section on line B B in Fig. 17. Fig. 20 is an enlarged side elevation of the forward portion of the body-frame and the forward vehicle-wheels. Fig. 21 is a view similar to Fig. 20, but showing the vehicle-wheels adjusted into a position over the body-frame. Fig. 22 is a plan of the parts shown in Fig. 20.

The bed or body frame A is preferably constructed with suitable supports and bearings for the several operative members of the machine and may be of any desired form and construction consistent with the arrangement of devices thereon and the purposes for which the machine is intended. The excavating-bucket B is associated with a frame or beam C, hereinafter termed the "bucket-beam." This bucket-beam can be raised and lowered in accordance with the desired depth of the excavation, and it can also be adjusted to different angles or degrees of inclination for the purpose of positioning the bucket with reference to the character of the work to be performed and so as to vary the angle of the cut made by the excavating-bucket at the end of the trench or ditch. The said bucket is mounted and arranged to travel up and down upon the said bucket-beam, so as to permit it to alternately load and discharge. The said bucket-beam is preferably composed of a pair of parallel I-beams connected in any suitable manner and having their upper end portions bent slightly forward, as shown in Figs. 1, 2, and 5. Constructed in this manner the said bucket-beam is adapted to provide a way or channel at each side along which the rolls $b$, carried by the bucket, are free to travel. It will also be seen that this bucket-beam is provided with a hinged lower section C', adapted to swing upwardly for the purpose of causing the bucket to assume an inverted position before commencing to load, as shown in Figs. 1 and 6. As a simple and efficient arrangement for raising and lowering this bucket-beam, so as to permit the bucket to operate at any desired depth, the rear surface of each I-beam of which the bucket-beam is composed is preferably provided with a rack $c$. These racks are engaged by pinions $c'$, mounted on the body-frame A. Referring to Fig. 2, it will be seen that the axis of these pinions is preferably coincident with the axis or pivotal point about which the bucket-beam is free to swing. This combined tilting and bodily adjustment of the bucket-beam is preferably obtained by providing a pair of bell-crank members $c^2$, carrying rolls $c^3$ at their outer ends and pivotally mounted at their elbows upon the pinion-shaft. These rolls $c^3$ are adapted to travel along the way provided by the inner surfaces of the two I-beams of which the bucket-beam is composed, and with this arrangement it will be seen that the beam is free to either tilt around the axis afforded by the pinion-shaft or to slide up and down relatively to the body-frame. With respect to the cable or cables D, which are preferably employed for operating the bucket, the upper end of the bucket-beam is preferably provided with sheaves $c^4$ and $c^5$, while the lower portion of the said beam is provided with sheaves $c^6$ and $c^7$. The sheaves $c^7$ are, it will be observed, mounted at the end of the hinged beam-section C', while the sheave $c^6$ is preferably mounted at the joint or articulation between the two sections of the bucket-beam. With this arrangement the ends of the cable or cables D can be suitably attached to the said bucket and can be trained over the sheaves, as shown in Fig. 1. The sheave $c^5$ is preferably "backed," so to speak, by springs $c^8$, which practically serve as medium of yielding connection between this sheave and the bucket-beam. With this arrangement the cable or cables will always be taut and the hinged lower section of the bucket-beam will be free to swing relatively to the main portion of the beam without straining or breaking any of the cable connections. A winding-drum D' is preferably provided for operating this cable connection. The engine E, through the medium of suitable power-transmitting connection, can be employed for driving this drum. It will also be seen that this engine can, if desired, be employed for raising and lowering the bucket-beam. For example, the shaft upon which the pinions $c'$ are mounted can be provided with a worm-wheel $c^9$, and the longitudinally-extending shaft $c^{10}$ can be provided at its rear end with a worm $c^{11}$, adapted to engage this worm-wheel. Any suitable power-transmitting connection can be employed between the engine and this shaft $c^{10}$. With this arrangement the engine can be employed for rotating the shaft $c^{10}$ one way or the other, and such rotation will cause the rack and pinion devices to either raise or lower the bucket-beam.

The horizontally or practically horizontally disposed beams F serve not only as a means for bracing the bucket-beam while the bucket is loading, but also as a means for varying the angle of the bucket-beam, so as to allow the bucket to operate either perpendicularly or at an angle. To such end the forward ends of these beams F are preferably pivoted to the bucket-beam at $f$ and have their rear end portions provided with racks $f'$. The pinions $f^2$, carried by the uprights A', are adapted to engage these racks and to rotate for the purpose of longitudinally adjusting the beams F. Any suitable arrangement can be employed for rotating these pinions $f^2$, so as to shift the beams F longitudinally. For example, the shaft upon which the pinions $f^2$ are mounted can be provided with a worm-wheel $f^3$, adapted to mesh with the worm $f^4$. This worm $f^4$ can be rotated either by hand or by power. As illustrated, a crank $f^5$ is provided and connected by bevel-gears $f^6$ with the lower end of the vertically-disposed shaft upon which the worm $f^4$ is mounted. With this arrangement a rotation of the crank $f^5$ will operate to rotate the pinion $f^2$, causing the latter to traverse the racks $f'$. In this way these beams, or "bucket-beam shifters," as they will hereinafter be termed, can be shifted longitudinally for the purpose of tilting the bucket-beam about its axis. The scope of this adjustment is preferably such as to permit the upper portion of the bucket-beam to be tilted rearward to an extent to allow the bucket to operate below an overhanging portion of the ground, or, in other words, so as to allow the bucket to form an undercut at the end of the trench. In this way the bucket can be caused to travel up and down either perpendicularly or at an angle, it being desirable to vary the line of travel of the bucket according to the character of the work and the nature of the soil. In Fig. 5 it will be seen that the upper portion of the bucket-beam is swung forward practically to the limit of its forward inclination. In such position the bucket-beam would cause the bucket to travel upwardly and forwardly in loading and travel downwardly and rearwardly in descending after unloading. If the trench or cut is of some depth, the bucket can be brought into position to load and when filled can then be swung back away from the end of the trench by adjusting the beams as shown in Fig. 5. In this way the bucket can be caused to load at the bottom of the trench and can then be swung rearward into a position to move freely upward to the point of discharge.

In order that the bucket may automatically unload at the desired point of discharge, its front wall $b'$ is preferably hinged at the bottom and adapted to swing down, as shown in dotted lines in Fig. 2 and as shown in full lines in Fig. 11. While loading, as shown in Fig. 7, this gate or swinging wall is held normally locked by the series of links by which it is connected with the side walls of the bucket. These links or connections comprise the relatively short links $b^2$ and $b^3$ and the relatively long link $b^4$ and the bell-crank $b^5$. It will be seen that the said bell-crank—it being understood that this arrangement is duplicated at the other side of the bucket—is pivoted to the side of the bucket at its elbow portion. The longer arm of each bell-crank is pivotally connected with the link $b^4$, which is pivotally connected with the hinged front wall $b'$ of the bucket, while the short arm of said bell-crank is pivotally connected with the link $b^3$. This short link $b^3$ is thus pivoted at one end to the short arm of said bell-crank, and its opposite end is, as shown in Figs. 11 and 12, pivoted to a short link $b^2$, which is in turn pivoted to a side of the bucket. By this arrangement the link $b^3$ and the link $b^2$ form a toggle which may be straight, as in Fig. 11, or bent, as in Fig. 12, according to the position of the bell-crank. When adjusted into the position shown in Fig. 7, it will be seen that the links $b^3$ and $b^2$ rest against the stop $b^6$ and that in this position they are "centered," so to speak. In other words, the pull exerted upon these links by the bell-crank does not tend to draw them away from the stops $b^6$. In this way the links and bell-cranks coöperate in normally locking the gate or hinged wall $b'$ in a closed position, so as to allow the bucket to properly load. The means for automatically releasing this locking mechanism, so as to allow the gate or wall to fall down and release the load, consists, preferably, of a plate or casting G, secured to one side of the upper or forwardly-bent portion of the bucket-beam. Each casting is provided with a plurality of projections having surfaces adapting them to operate as cams.

Referring to Figs. 8, 11, and 12 and to Figs. 7 and 6, it will be seen that the joint or articulation between the links $b^2$ and $b^3$ consists, preferably, of a pin $b^7$. These pins project laterally from the sides of the bucket, as shown in Fig. 9. As the bucket moves upwardly and approaches the castings G the pins $b^7$ first encounter or engage the cams $g$, as shown in Fig. 8, which causes the links $b^2$ and $b^3$ to move away from the stops $b^6$. Once started in this direction the pressure of the earth on the gate or swinging wall $b'$ is sufficient to draw the links and bell-cranks into the position shown in Fig. 11. This is sufficient, it will be seen, to allow the gate or swinging wall $b'$ to drop down and hang pendent, thereby allowing the load to fall from the bucket. After discharging, the bucket then starts downward again and the pins $b^7$ first engage the upper surfaces of the cams $g'$, as shown in Fig. 11. Continuing its downward movement, the bucket causes the pins $b^7$ to slide along the cam-surfaces presented by the cam $g'$, the latter in this way causing the bell-cranks and links to assume the position shown in Fig. 12. Further downward movement brings the pins $b^7$ into contact with the surfaces presented by the cams $g^2$, which are adapted to effect the final closing movement of the gate or swinging front wall of the bucket. In other words, the cams $g^2$ force the links $b^2$ and $b^3$ over into their normal position against the stops $b^6$. This is shown in dotted lines in Fig. 11. With its gate or swinging wall thus closed and locked the bucket then descends to the bottom of the cut and assumes the inverted position shown in Fig. 6 before commencing to load. In order to facilitate loading, the bucket is preferably provided with an edge or lip $b^8$. In moving upward it will be seen that the pins $b^7$ do not strike the cams $g'$ and $g^2$, for the reason that the angle or bent portion of the bucket-beam practically changes the line of travel of the bucket sufficiently to allow these pins to pass by these two cam portions and engage the cams $g$.

The car H is adapted and arranged to receive the dirt discharged from the excavating-bucket. It will be observed that this car is arranged to travel back and forth across the machine below the point of discharge. To such end the body-frame is preferably provided with transversely-arranged tracks $a$, upon which the wheels $h$ of the car are adapted to travel. The laterally-projecting portion of the track I is adapted to be shifted from one side of the machine to the other, so as to permit the car to travel outwardly and discharge its load at either side of the line of travel. This projecting track or track portion is preferably pivoted to the body-frame at $i$. A suitable hand-wheel shaft $i'$ can be provided at each side of the machine with a view to permitting the swinging track I to be properly adjusted either at one side of the machine or the other. Chains or like flexible connections $i^2$ can be employed for connecting either hand-wheel shaft with the outer end of the swinging track I. The said car is preferably connected by a cable $h'$ with the winding-drum H'. This winding-drum, it will be observed, is preferably arranged between the car and the previously-described winding-drum D'. The ends of the cable are preferably attached to the ends of the car and are arranged to travel around sheaves $h^2$ and $h^3$, suitably mounted upon the body-frame of the machine. In addition to these, sheaves $i^3$, $i^4$, and $i^5$ are suitably mounted and arranged upon the swinging track I. In this way the cable $h'$ is properly trained over sheaves and arranged to operate transversely to the machine and is wound in and paid out by the rotary drum H'. It will be seen, therefore, that this drum when rotated causes the cable to draw the car back and forth along the transversely-arranged track. In order to permit the car to automatically discharge its load at the outer end of the track I, the latter is preferably raised at its middle portion, as shown in Fig. 4, so as to provide an outer portion which inclines downwardly to an extent to tilt the car down at its outer end, as shown in dotted lines. The said car can be constructed with end-gates $h^4$, adapted to be locked in place by bars $h^5$. The outer end of the track I can be provided with a projection or cam portion $i^6$, adapted to engage the end of either of the two bars $h^5$, according to the side to which the car is drawn for the purpose of discharging its load. With this arrangement the car can receive the dirt discharged from the excavating-bucket and can then be drawn across the machine and out upon the track I. The outer end of the track I is preferably bent or turned up to an extent to provide a stop for limiting the travel of the car. Upon reaching the limit of its outward movement the car is caused to assume a tilted position, as shown in Fig. 4, and the projection or cam $i^6$ in striking the locking-bar operates to release the end-gate of the car and to thereby cause the latter to automatically unload. In other words, it will be seen that the arrangement is such that the car travels out and is brought to a sudden standstill in a tilted position, and then at the same time its end-gate is automatically opened, so as to allow it to practically throw out or eject the load. The hand-wheel shafts $i'$ can be rotated so as to wind in or pay out the chain $i^2$, and in this way the track I can be adjusted to any desirable angle or inclination. Any suitable means can be employed for locking the hand-wheel shafts against rotation after they have been properly adjusted.

It will be readily understood that any suitable arrangement can be employed for causing the machine to move forward as fast as the excavating progresses. For example, a warping-drum J can be provided and mounted at the forward end of the machine. By winding one end of a cable upon this drum and attaching the other end of the cable to some stationary object the machine can be drawn forward or warped into the desired position. The said drum can be driven from the engine through the medium of any suitable power-transmitting connection.

The engine E, which, as stated, is preferably employed for rotating all of the said drums, can, if desired, comprise two cylinders and pistons, as shown in Fig. 3. With this arrangement the motive power can consist of two practically independent engines. These engines can be driven in opposite directions, so as to facilitate the reversal of the bucket and car. It will be readily understood that any suitable power-transmitting connection can be employed between the engine and the two winding-drums for operating the bucket and car. It will also be understood that the clutches $e$, $e'$, $e^2$, and $e^3$ for controlling the transmission of power can be of any suitable form or character. A clutch $e^4$ can also be employed for controlling the transmission of power between the engine and the warping-drum and between the engine and the gearing for raising and lowering the bucket-beam. In other words, the motive power and power-transmitting connections for driving the drums and for adjusting the bucket-beam can be of any suitable form or character. Preferably, however, as shown and described, the power-transmitting connections for the different purposes are independent of each other, so as to make it possible to operate any of the various devices independently and without operating the others. An upright boiler K of any suitable form or character can be employed for generating steam for the said engine.

With further respect to the arrangement of the cable for operating the bucket it will be seen that a sheave $f^6$ is preferably arranged with its axis coincident with the pivotal connection between the bucket-beam and the bucket-beam shifter. The cable D is trained over this sheave, as shown in the drawings, and also over another sheave $f^7$, which is mounted upon a shaft having the pinion $c'$. When the bucket is in an inverted position, as shown in Figs. 1 and 6, the forward portion of the cable engages the sheave $c^6$. However, when the bucket is swung around into the position shown in Fig. 7 the forward portion of the cable leaves the sheave $c^6$, and the rear portion of the cable is then engaged by the sheaves $c^7$, as shown in said figure.

Preferably the bed-frame is adapted to form a truck frame or body, which can be supported by wheels and rolls in alternation, according to circumstances, and to such end it is provided with rolls or relatively small wheels N, by which it can be supported when the machine is at work, and with front and rear wheels M and L, which can be employed for supporting the machine when it is to be transported from place to place. In Figs. 2, 3, and 4 the machine is shown supported by truck-rolls N, which in practice may run upon tracks or plankways, as best illustrated in Fig. 4, in which the rolls, arranged in pairs, are supported at plankways positioned at opposite sides of the excavation. In Fig. 1 the machine is raised from the position illustrated in Figs. 2, 3, and 4 and is supported by the wheels L and M. With reference to these wheels the bolster $m$ for the front wheels is hinged to the truck or bed frame, as at $m'$, Figs. 20 and 21, and held in working position by one or more stay-rods $m^2$, suitably attached to the bolster and detachably connected with the bed-frame in any suitable way, as at $m^3$, in which one of such rods is shown with an eye caught upon a hook upon the bed-frame. In order to lower the forward end of the machine, the said stay-rods can be detached from the bed-frame and the bolster can be swung into a position over the bed-frame, as shown in Fig. 21. The bolster $l$ for the rear wheels (see Fig. 1) can, however, be removably secured to the bed-frame, and to such end it can be adapted to have a sliding connection with a way formed by clamp-plates $l'$ on the under side of the bed-frame. With this arrangement the rear wheels can be removed by sliding the bolster in a direction transverse with the bed-frame, so as to free it from the latter. The front and rear vehicle-wheels are, it will be seen, adapted to afford a means for readily transporting the machine from one place to another, but would not provide as efficient and firm a base as might be desired for the machine when the excavating is in progress. The rolls or relatively small wheels N are, however, of a character to not only firmly and properly support the machine during the operation of the bucket, but are also adapted to travel along the tracks or planks $m^4$, laid upon the ground. Thus I practically provide one set of wheels for transporting the machine from one place to another and provide another set of wheels for supporting the machine during the operation of digging a ditch or trench.

Thus it will be seen that I provide a simple and efficient machine adapted more particularly for use in digging trenches and building sewers. The excavating-bucket is, as explained, adapted to travel back and forth upon the bucket-beam, so as to automatically load and unload. The cable connections not only control the movement of the bucket, but also, it will be seen, cause the relative movement between the two sections of the beam necessary for inverting the bucket before it begins to load. The bucket-beam is preferably held firmly against lateral movement, but, as explained, has a free forward-and-back or tilted movement in addition to its bodily rise and fall. With this arrangement the bucket can be caused to operate at any depth, can be made to travel up and down at any angle, and can be readily manipulated or controlled with respect to the character of the work and the nature of the soil. After loading, the bucket travels upward, and upon reaching the bend in the bucket-beam it automatically opens and allows its load to be discharged into the car. The latter is then caused to travel outward upon the swinging track-section, where it then, as previously explained, automatically discharges or unloads the dirt at the side of the machine. The bucket-beam shifter is effective, as stated, not only in bracing and holding the bucket-beam in position to hold the bucket against the end of the cut, but also in adjusting or changing the inclination of the bucket-beam. The arrangement of the motive power and the winding-drums is such that the bucket and car are under the complete control of the attendant or operator. Thus constructed the machine is strong, simple, and of a character to insure against breakage, clogging, or any interruption in the work. At the same time it is capable of rapid, satisfactory, and efficient work in cutting trenches and digging ditches.

The machine thus described involves a vibratory and longitudinally-movable track or beam C, fulcrumed between its ends upon the main or body frame and arranged to have its end movements independent of the fulcral point, about which it can tilt or vibrate, and a push-and-pull device for tilting the beam arranged to apply the power for such purpose to the portion of the beam which extends above the fulcral point and which forms an upper lever-arm. By this arrangement the beam operates as a vibratory lever having a relatively shifting fulcrum between its upper and lower arms, such relative shifting being attained by moving the beam longitudinally. By applying power to the upper arm of the beam so as to tilt it in a direction to swing its lower arm upwardly the advantages of a lever of such order are secured, and manifestly the beam can be so nearly balanced as to require but little power to thus operate it, and employing a beam-shifter consisting of a vibratory and longitudinally-adjustable frame or beam hinged or pivotally attached to the beam C the degree of inclination of the latter can be positively adjusted and controlled. The beam can also be easily tilted by a thrust or push in one direction and by a pull in an opposite direction, according to the direction in which this reciprocating beam-shifter is moved.

I claim as my invention—

1. In an excavating-machine, a body-frame; a tilting beam and a fulcral support therefor on the body-frame, the beam being extended below its fulcral support to dip into an excavation and extended above such fulcral support to form an upper lever-arm, said beam being also longitudinally adjustable independently of its fulcral support to permit its lower end portion to be lowered within and raised from the excavation; mechanism for longitudinally adjusting the beam; a push-and-pull beam-shifter for tilting the beam arranged to apply the tilting power to the upper lever-arm formed by the portion of the beam above its fulcral support; an excavating device arranged to traverse the tilting beam; and mechanism for reciprocating the excavating device along said beam.

2. In an excavating-machine, a body-frame; a tilting beam and a fulcral support therefor upon the body-frame, the beam being supported for longitudinal movement independent of its fulcral support, and extended above and below the latter; a reciprocative beam-shifting device pivotally connected with the beam above its fulcral support and adapted as a push-and-pull device for tilting the beam; and an excavating device arranged to traverse the tilting beam.

3. An excavating-machine comprising a suitable body-frame, a tilting bucket-beam mounted upon said frame, an excavating-bucket arranged to slide back and forth upon said beam, a beam-shifter arranged for varying the angle of the bucket-beam, and a rack-and-pinion device for operating said shifter.

4. An excavating-machine comprising a suitable body-frame, a bucket-beam supported by the body-frame and mounted for both tilting and endwise adjustment, a rack-and-pinion device for adjusting the said beam endwise, an excavating-bucket arranged to travel back and forth upon said beam, one or more cables and a winding-drum for operating said bucket, a beam-shifter having a pivotal connection with said bucket-beam and adapted for varying the angle of the latter, and suitable gearing for operating said shifter.

5. An excavating-machine comprising an adjustable bucket-beam composed of relatively short and relatively long sections hinged together, an excavating-bucket arranged to travel back and forth upon said beam, and one or more cables and a winding-drum connected and arranged for both operating said bucket and causing a relative movement between the sections of said beam.

6. An excavating-machine comprising a bucket-beam composed of hinge-connected sections, an excavating-bucket arranged to travel back and forth upon said beam, one or more cables connected and arranged for both operating said bucket and causing the lower beam-section to swing upward and around its pivotal connection with the other section, and a winding-drum for operating said cables.

7. An excavating-machine comprising a relatively long bucket-beam section, a relatively short bucket-beam section pivotally connected to the lower end of said relatively long section, an excavating-bucket adapted to travel back and forth upon said beam, one or more cables connected and arranged to both operate said bucket and cause a relative swinging movement between the two sections of the bucket-beam, both the bucket and the relatively short section of the beam occupying an inverted position before the bucket starts to load, and a winding-drum for operating said cables.

8. An excavating-machine comprising a suitable body-frame, a tilting bucket-beam mounted at the rear end of said frame, said beam being constructed with a hinged lower portion, an excavating-bucket provided with rolls adapted to travel in ways on said beam, one or more cables connected with said bucket, and a winding-drum arranged to operate said cables.

9. An excavating-machine comprising a suitable body-frame, a bucket-beam supported by the said frame and mounted for both tilting and endwise movement, an excavating-bucket provided with rolls adapted to travel in ways on said beam, a rack-and-pinion device for adjusting said beam endwise, sheaves mounted at the upper and lower ends of said beam, one or more cables trained over said sheaves and connected for operating said bucket, a pair of horizontally-disposed beams having their ends pivotally connected with said bucket-beam, and suitable gearing for shifting said horizontally-disposed beams endwise, so as to vary the angle of said bucket-beam.

10. An excavating-machine comprising a suitable body-frame mounted upon wheels, a bucket-beam supported by the rear end of said frame, an excavating-bucket arranged to travel up and down said beam and provided with a hinged side, one or more cables connected with and arranged to operate said bucket, a winding-drum for operating said cables, and a tripping device mounted upon said beam and arranged in position to trip the said hinged side and thereby automatically open the bucket at the desired point of discharge.

11. An excavating-machine comprising a pivotally-supported bucket-beam, an excavating-bucket arranged to travel back and forth upon said beam and provided with a swinging front wall, a series of links connecting said wall with the side walls of the bucket, one or more cables connected and arranged to operate said bucket, and a tripping device mounted upon said beam and arranged in position to engage said links, so as to open the hinged front wall and thereby cause the bucket to automatically release its load at the desired point of discharge.

12. In an excavating-machine, a tilting beam having its lower end portion hinged to the main length of the beam and normally in alinement therewith; an excavating device arranged to traverse the beam including hinged lower end portion thereof; and means for swinging said lower end portion of the beam into and out of alinement with the upper portion to which it is hinged.

13. An excavating-machine comprising an endwise-adjustable and pivotally-mounted bucket-beam, a rack-and-pinion device for adjusting said beam endwise, an excavating-bucket arranged to travel back and forth upon said beam, one or more cables connected and arranged to operate said bucket, a winding-drum for operating said cable or cables, a carrying device arranged to travel back and forth below the point of discharge of said bucket, and one or more cables and a winding-drum for operating said carrying device.

14. An excavating-machine comprising a shifting bucket-beam, a beam-shifter pivotally connected with said bucket-beam, suitable gearing for adjusting said shifter, an excavating-bucket mounted to travel up and down upon said bucket-beam, one or more cables and a winding-drum for operating said bucket, and a car mounted and arranged to travel back and forth below the point of discharge of said bucket.

15. An excavating-machine comprising a suitable body-frame mounted upon wheels, an engine and boiler mounted upon said body-frame, a warping-drum carried by the forward portion of said body-frame, suitable power-transmitting connection between said engine and said warping-drum, a vertically-disposed member carried by the rear end of said body-frame, an excavating-bucket adapted to travel up and down upon said member, a hinged member for causing the bucket to assume an inverted position before commencing to load, one or more cables for operating said bucket, a winding-drum for operating said cables, and independent power-transmitting connection between said engine and said winding-drum.

16. An excavating-machine comprising a pivotally-supported and practically vertically-disposed member, adjusting devices for varying the angle of said member, an excavating-bucket arranged to travel up and down upon said member, a hinged section of said member adapted to cause the bucket to assume an inverted position before commencing to load, one or more cables for operating said bucket, and suitable winding means for operating said cable or cables.

17. An excavating-machine comprising a suitable body-frame mounted upon wheels, a vertically-disposed member pivotally mounted at the rear end of said frame, a rack-and-pinion device for raising and lowering said member, a pair of horizontally-disposed beams connected with and adapted for varying the angle of said member, an excavating-bucket arranged to travel up and down upon said member, a hinged section of said member adapted to cause said bucket to assume an inverted position before commencing to load, and suitable power-transmitting connections for causing the up-and-down movement of said bucket.

18. An excavating-machine comprising a tilting bucket-beam, an excavating-bucket mounted to travel up and down upon said beam, said bucket being provided with a hinged front wall, a series of links connecting said hinged wall with the side walls of said bucket, power-transmitting connections for causing the up-and-down movement of said bucket, and a cam device carried by the upper portion of said bucket-beam and adapted to engage a pin carried by one of said links, whereby the said hinged front wall is automatically opened and the bucket allowed to release its load at the desired point of discharge.

19. An excavating-machine comprising a tilting bucket-beam, an excavating-bucket arranged to travel up and down upon said bucket-beam, a hinged lower section of said beam adapted to cause the bucket to assume an inverted position before commencing to load, suitable connections for causing the up-and-down movement of said bucket, said bucket being provided with a hinged front wall, bell-cranks and links serving as medium of connection between said hinged wall and the side walls of the bucket, and a plurality of cams arranged in position to engage pins carried by certain of said links, whereby the bucket is caused to automatically release its load at the desired point of discharge.

20. An excavating-machine comprising an excavating-bucket arranged to travel back and forth in ways, said bucket being provided with a hinged front wall, a pair of bell-cranks pivotally connected with the side walls of the bucket, links connecting the hinged front wall of the bucket with the longer portions of said bell-cranks, links connecting the shorter arms of said bell-cranks with the side walls of said bucket, stops for limiting the movement of said last-mentioned links in one direction, so as to lock or maintain the said hinged front wall in a closed position, and a plurality of cams arranged in position to engage pins carried by said last-mentioned links, whereby the hinged front wall is automatically unlocked and the bucket allowed to release its load at the desired point of discharge.

21. An excavating-machine comprising a vertically-disposed and pivotally-mounted bucket-beam, an excavating-bucket arranged to travel up and down upon said beam, said bucket being provided with a hinged wall, a plurality of links and bell-cranks for locking or maintaining said hinged wall in a closed position, a cam device carried by said beam and arranged to cause said hinged wall to automatically open and close.

22. An excavating-machine comprising a suitable body-frame, a bucket-beam provided with a rack, pinions carried by the frame and arranged to engage said rack, a member pivotally supported upon the body-frame and having its pivotal point or axis coincident with the axis of said pinion, rolls carried by said pivoted member and arranged to engage a way formed in the side of the bucket-beam, an excavating-bucket arranged to travel up and down upon said bucket-beam, and suitable cable connections for operating said bucket.

23. An excavating-machine comprising a suitable body-frame, a bucket-beam having a shifting connection with said body-frame, an excavating-bucket adapted to travel up and down upon said beam, means for causing the bucket to assume an inverted position before causing to load, suitable connections for causing the up-and-down movement of said bucket, and a device carried by the upper portion of the beam and adapted to cause the bucket to automatically unload at the desired point of discharge.

24. An excavating-machine comprising a suitable body-frame, a member carried by said body-frame and mounted for both tilting and endwise adjustment, an excavating-bucket arranged to travel up and down upon said member, a hinged lower section of said member adapted to swing upward and thereby cause the bucket to assume an inverted position before commencing to load, horizontally-disposed beams pivotally connected with the said member and adapted for varying the angle of the latter, suitable means for causing the up-and-down or traveling movement of said bucket, a device carried by the upper portion of said member and arranged to cause the bucket to automatically unload at the desired point of discharge, and a transversely-traveling car arranged to travel back and forth below the point of discharge of said bucket.

25. An excavating-machine comprising a suitable body-frame, a substantially vertically-disposed tilting member carried by the rear end of said frame, horizontally-disposed beams having their rear ends pivotally connected with said member, racks carried by said beams, pinions arranged to engage said racks, worm-gearing for rotating said pinions, so as to shift said beams and thereby vary the angle of said member, an excavating-bucket adapted and arranged to travel up and down upon said member, flexible connections trained over sheaves on said member and connected with said bucket, and a winding-drum suitably operated for winding in and paying out said flexible connections.

26. An excavating-machine comprising a suitable body-frame, a pivotally-supported member carried by said body-frame, a rack mounted on said member, a pinion carried by the body-frame and arranged to engage said rack, an engine and boiler mounted upon said body-frame, suitable power-transmitting connection between said engine and said pinion, whereby the engine may be employed for raising and lowering said member, an excavating-bucket arranged to travel up and down upon said member, one or more cables connected and arranged for operating said bucket, a winding-drum for operating said cables, and independent power-transmitting connection between said engine and said drum.

27. An excavating-machine comprising a suitable body-frame, a member adjustably mounted upon said body-frame, an engine and boiler mounted upon said body-frame, power-transmitting connection whereby said engine may be employed for raising and lowering said member, an excavating-bucket arranged to travel up and down upon said member, independent power-transmitting connection between said engine and said bucket, means for causing the bucket to automatically unload at the desired point of discharge, a car traveling back and forth across the body-frame below the said point of discharge, and independent power-transmitting connection between the engine and said car.

28. An excavating-machine comprising a suitable body-frame, an engine and boiler mounted upon said frame, a warping-drum mounted at the forward end of said frame, power-transmitting connection between said engine and warping-drum, a structure adjustably supported by said frame providing a way, an excavating-bucket arranged to travel up and down said way, independent power-transmitting connection whereby said engine can be employed for raising and lowering said structure, one or more cables and a winding-drum for operating said bucket, independent power-transmitting connection between said engine and said winding-drum, a carrying device arranged to travel back and forth across the machine below the point of discharge of said bucket, a cable and a winding-drum for drawing said carrying device back and forth, and independent power-transmitting connection between said engine and said last-mentioned winding-drum.

29. An excavating-machine comprising a body-frame, an adjustable bucket-beam carried by the rear end of said frame, an excavating-bucket arranged to travel up and down on the forward side of said beam, suitable connections for operating said bucket, and an engine connected and arranged for raising and lowering said bucket-beam.

30. An excavating-machine comprising a suitable body-frame, a structure carried by said body-frame and adapted to provide a suitable way, an excavating-bucket adapted to travel up and down in said way, flexible connections for operating said bucket, a car arranged to travel back and forth across the said machine, a device for causing the said bucket to automatically unload into said car, and a device for causing said car to automatically unload when it reaches the outer end of its track.

31. An excavating-machine comprising a suitable body-frame, an excavating device adapted and arranged to load and carry the dirt upward, a car arranged to receive the dirt from said excavating device, a track projecting from the side of said body-frame, a cable and winding-drum for drawing said car out upon said track, and a device for causing said car to automatically unload at the desired point of discharge.

32. An excavating-machine comprising a suitable body-frame, an excavating-bucket mounted and arranged to load and carry the dirt upward, a car arranged to receive the dirt from said bucket, a swinging track projecting from the side of said body-frame, adjusting devices for raising and lowering said track, suitable flexible connections for drawing said car out upon said track, and a device for causing said car to automatically unload at the desired point.

33. An excavating-machine comprising a suitable body-frame, an excavating-bucket mounted and arranged to load and carry the dirt upward, a car arranged to receive dirt from the said bucket, a laterally-projecting track pivotally connected with the side of said body-frame, a rotary hand-wheel shaft, flexible connections connecting said hand-wheel shaft with the outer end of said track, whereby the latter may be raised and lowered, and a cable and winding-drum for drawing said car out upon said track.

34. An excavating-machine comprising a suitable body-frame, a bucket-beam carried by said frame, an excavating-bucket adapted and arranged to travel up and down upon said beam, one or more cables and a winding-drum for operating the said bucket, an engine for driving said drum, a car arranged to receive the dirt from said bucket, a track projecting laterally from said body-frame, said track having a downwardly-inclined outer portion, a cable and a second winding-drum for drawing said car out upon said track, and a stop arranged for limiting the outward movement of said car.

35. An excavating-machine comprising a suitable body-frame, an excavating-bucket mounted and arranged to load and carry the dirt upward, a car arranged to receive the dirt from said bucket, a swinging track pivotally connected at its inner end with the body-frame, the said track being formed with a raised middle portion providing an incline, and also formed with an upwardly-projecting end portion, a cable and drum for drawing said car out upon said track, and a device for causing said car to automatically unload at the desired point of discharge.

36. An excavating-machine comprising a suitable body-frame, an excavating-bucket mounted and arranged to load and carry the dirt upward, a car arranged to receive the dirt from said bucket, a laterally-projecting track shiftable from one side of the machine to the other, and a cable and drum adapted and arranged for operating the car at either side of the machine.

37. An excavating-machine comprising a suitable body-frame, relatively small wheels carried by said frame, relatively large wheels adapted to support the said body-frame, an excavating-bucket suitably carried by said body-frame, a cable connection for operating said bucket, and suitable connections admitting the withdrawal of the said relatively large wheels from beneath the body-frame and allowing the latter to be supported by the said relatively small wheels.

38. An excavating-machine comprising a suitable body-frame, an excavating device carried by said body-frame, relatively small wheels carried by said body-frame and adapted to travel upon planks or tracks, relatively large vehicle-wheels adapted to support the body-frame and relatively small wheels in an elevated position, and suitable connections intermediate of said body-frame and relatively large wheels whereby the latter may be withdrawn, so as to allow the relatively small wheels to support the body-frame.

39. An excavating-machine comprising a suitable body-frame, a bucket-beam carried at the rear end of said body-frame, an excavating-bucket adapted to travel up and down upon said bucket-beam, a cable and winding-drum for operating said bucket, relatively small wheels carried by said body-frame, relatively large wheels adapted to support the said body-frame and relatively small wheels in an elevated position, and suitable connections between said body-frame and relatively large wheels, whereby the latter may be withdrawn so as to allow the body-frame to be supported by the relatively small wheels.

40. An excavating-machine comprising a suitable body-frame, a suitable excavating device carried by said body-frame, relatively small wheels carried by said body-frame, relatively large wheels adapted to support the body-frame and relatively small wheels in an elevated position, suitable connections whereby the rear relatively large wheels may be detached from the body-frame, and suitable connections whereby the forward relatively large wheels may be swung into a position above the body-frame, so as to allow the body-frame to be lowered and supported by the relatively small wheels.

41. An excavating-machine comprising a suitable body-frame, a tilting bucket-beam carried by said body-frame and having a lower hinged swinging section, an excavating-bucket adapted to travel up and down upon said beam, sheaves mounted upon the lower portion of said beam, sheaves carried by the upper portion of said beam, springs serving as medium of yielding connection between the beam and one of the upper sheaves, one or more cables trained over said sheaves and connected with said bucket, a suitable arrangement for varying the angle of said bucket-beam, and a winding-drum for winding in and paying out said cable or cables.

42. An excavating-machine comprising a suitable body-frame, a bucket-beam having a pivotal connection with said body-frame, a beam-shifter having a pivotal connection with said bucket-beam, gearing for adjusting said beam-shifter, so as to vary the angle of said bucket-beam, an excavating-bucket adapted to travel up and down said bucket-beam, sheaves carried by said bucket-beam, the axis of one of said sheaves being coincident with the pivotal connection between the bucket-beam and the bucket-beam shifter, one or more cables trained over said sheaves and connected with said bucket, a drum for operating said cable, and an engine for operating said drum.

43. An excavating-machine comprising a suitable body-frame, an excavating device carried by said body-frame, a car arranged to receive the dirt from said excavating device, a laterally-projecting track shiftable from one side of the body-frame to the other, said car being provided with end-gates, a cable and drum arranged to operate said car at either side of the machine, and a device carried by the end of said track and adapted to automatically release either end-gate of the car, so as to allow the car to discharge at either side of the machine.

44. An excavating-machine comprising a suitable body-frame, an excavating device carried by said body-frame, relatively small wheels carried by said body-frame, relatively large rear vehicle-wheels adapted to be removed laterally from the body-frame, relatively large front vehicle-wheels having a swinging connection with the body-frame, whereby the said front vehicle-wheels may be swung into a position above the body-frame, the removal of both front and rear vehicle-wheels permitting the body-frame to be lowered and supported by the said relatively small wheels.

45. An excavating-machine comprising a suitable body-frame, a suitable excavating device carried by said body-frame, a car adapted to receive the dirt from said excavating device, a swinging track shiftable from one side of the machine to the other, a hand-wheel shaft mounted at each side of said machine, flexible connections for connecting said track with either of said shafts, and a cable and winding-drum for drawing said car out upon said track.

46. An excavating-machine comprising a suitable body-frame, a suitable excavating device carried by said body-frame, a car adapted to receive the dirt from said excavating device, a swinging track shiftable from one side of the body-frame to the other, said track having a raised middle portion adapted to provide a downwardly-projecting incline or outer portion, a hand-wheel shaft mounted at each side of the body-frame, flexible connections for connecting the outer end of said track with either of said shafts, a cable and winding-drum adapted for drawing said car out upon the track at either side of the machine, said car being provided with end-gates, and a device at the outer end of the track for automatically unlocking either end-gate, so as to allow the car to automatically unload at the desired point of discharge.

47. An excavating-machine comprising a suitable body-frame, a bucket-beam pivotally supported at the rear end of said body-frame, an excavating-bucket adapted to travel up and down the forward side of said beam, a hinged lower section of said beam adapted to swing upward for the purpose of causing said bucket to assume an inverted position before commencing to load, power-transmitting connections for causing said beam to move bodily up and down, a cable and winding-drum for operating said bucket, and adjustable members suitably connected with and adapted to vary the angle of said beam.

48. An excavating-machine comprising a horizontally-disposed body-frame mounted upon front and rear vehicle-wheels, an engine and boiler carried by the middle portion of said body-frame, a warping-drum mounted forward of said boiler, power-transmitting connection between said engine and said warping-drum, a substantially vertically disposed bucket-beam having shifting connection with the rear end of said body-frame, a rack-and-pinion device for raising and lowering said bucket-beam, substantially horizontally disposed beams having their rear ends pivotally connected with said bucket-beam, suitable gearing for longitudinally adjusting said horizontally-disposed beams, so as to vary the angle of said bucket-beam, an excavating-bucket constructed and arranged to travel up and down upon said bucket-beam, a hinged lower section of said bucket-beam adapted to cause said bucket to assume an inverted position before commencing to load, a transversely-traveling car adapted to receive dirt from said bucket, said car being arranged to operate between the engine and said bucket-beam, a pair of winding-drums mounted between said car and said engine, a cable connecting one of said drums with said car, and a cable connecting the other drum with said bucket.

49. An excavating-machine comprising a structure adapted to provide a way, an excavating-bucket adapted to travel back and forth along said way, adjusting devices for bodily adjusting said structure, means for causing said bucket to assume an inverted position before commencing to load, and a cable and winding-drum for causing the back-and-forth movement of said bucket.

50. An excavating-machine for making trenches or sewers, comprising a suitable structure adapted to be lowered into the trench, an excavating-bucket adapted to travel up and down the forward side of said structure, means for causing the bucket to assume an inverted position at the bottom of the trench before commencing to load, a device for causing the bucket to automatically unload at the desired point of discharge, and a cable and winding-drum for operating said bucket.

51. An excavating-machine comprising a suitable body-frame, a bodily-adjustable member composed of a plurality of articulated sections, an excavating-bucket provided with rolls adapted to travel back and forth on said sections, said sections being adapted to swing relatively to each other, so as to change the position of the bucket, and a cable and winding-drum for operating said bucket.

52. A machine for digging trenches or sewers, comprising a suitable body-frame, a pivotally-supported and bodily-adjustable member composed of a plurality of articulated sections, said member being adapted to be lowered into the trench or sewer, an excavating-bucket adapted to travel up and down the forward side of said member, the said sections being adapted to swing relatively to each other, so as to vary the position of the bucket, adjusting mechanism for varying the angle of said member, a device for causing the bucket to automatically unload at the desired point of discharge, a cable and winding-drum for operating said bucket, and an engine for driving said winding-drum.

FRANK M. BISBEE.

Witnesses:
CHARLES G. PAGE,
OTTILIE C. FREIBERG.